United States Patent
Doherty et al.

(10) Patent No.: US 10,681,496 B2
(45) Date of Patent: *Jun. 9, 2020

(54) DYNAMICALLY CREATING FITNESS GROUPS

(71) Applicant: International Business Machines Corporation, Armonk, NY (US)

(72) Inventors: Liam M. Doherty, Subiaco (AU); Benjamin T. Horwood, North Perth (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/511,116

(22) Filed: Jul. 15, 2019

(65) Prior Publication Data

US 2019/0342706 A1 Nov. 7, 2019

Related U.S. Application Data

(63) Continuation of application No. 15/964,183, filed on Apr. 27, 2018, now Pat. No. 10,390,176, which is a (Continued)

(51) Int. Cl.
*H04W 4/02* (2018.01)
*H04W 4/08* (2009.01)

(52) U.S. Cl.
CPC ............ *H04W 4/023* (2013.01); *H04W 4/08* (2013.01)

(58) Field of Classification Search
None
See application file for complete search history.

(56) References Cited

U.S. PATENT DOCUMENTS

| 6,013,007 A | 1/2000 | Root et al. |
| 7,593,740 B2 | 9/2009 | Crowley |

(Continued)

FOREIGN PATENT DOCUMENTS

| CN | 102314557 A | 1/2012 |
| JP | 5947245 B2 | 7/2016 |

OTHER PUBLICATIONS

Dachis, "Fitness Buddy is a Comprehensive Exercise Planner, Tracker, and Instructor for Your Smartphone", lifehacker, Feb. 14, 2012, 2 pages, <http://lifehacker.com/5885008/fitness-buddy-is-a-comprehensive-exercise-planner-tracker-and-instructor-for-your-smartphone>.

(Continued)

*Primary Examiner* — Ajit Patel
(74) *Attorney, Agent, or Firm* — Alexander G. Jochym

(57) ABSTRACT

In an approach to locating nearby computing device users to participate in a fitness activity, one or more computer processors receive from a first computing device of a first user, a selection of a fitness activity and a request to locate at least one second computing device associated with at least one second user in a vicinity of the first computing device to join in a fitness activity. The approach includes one or more computer processors determining the at least one second computing device associated with the least one second user is located in the vicinity of the first computing device. Furthermore, the approach includes one or more computer processors determining directions for the first user and the at least one second user to meet.

19 Claims, 5 Drawing Sheets

Related U.S. Application Data continuation of application No. 15/662,513, filed on Jul. 28, 2017, now Pat. No. 9,986,383, which is a continuation of application No. 15/279,834, filed on Sep. 29, 2016, now Pat. No. 9,794,752.

(56) References Cited

U.S. PATENT DOCUMENTS

| | | | |
|---|---|---|---|
| 9,248,340 | B2 | 2/2016 | Hoffman et al. |
| 9,392,417 | B1 | 7/2016 | Venkatraman |
| 9,760,955 | B2 * | 9/2017 | Soni .................. G06F 16/70 |
| 9,794,752 | B1 | 10/2017 | Doherty |
| 9,986,383 | B2 | 5/2018 | Doherty |
| 2005/0192156 | A1 | 9/2005 | Daikeler et al. |
| 2005/0250458 | A1 | 11/2005 | Graham |
| 2008/0109158 | A1 | 5/2008 | Huhtala et al. |
| 2009/0005018 | A1 | 1/2009 | Forstall |
| 2009/0286549 | A1 | 11/2009 | Canon |
| 2012/0079018 | A1 | 3/2012 | Rottler |
| 2012/0221639 | A1 | 8/2012 | Mallet |
| 2013/0079037 | A1 | 3/2013 | Dobyns |
| 2013/0166048 | A1 | 6/2013 | Werner et al. |
| 2013/0325394 | A1 | 12/2013 | Yuen et al. |
| 2014/0213280 | A1 | 7/2014 | Sandel |
| 2014/0354441 | A1 | 12/2014 | Luna |
| 2015/0004912 | A1 * | 1/2015 | Diamond .............. H04W 4/023 455/41.2 |
| 2015/0081210 | A1 | 3/2015 | Yeh |
| 2015/0127728 | A1 | 5/2015 | Marti et al. |
| 2015/0127737 | A1 | 5/2015 | Thompson et al. |
| 2015/0261844 | A1 | 9/2015 | Ramalho |
| 2016/0066149 | A1 | 3/2016 | Pahwa et al. |
| 2016/0088438 | A1 * | 3/2016 | O'Keeffe ................ H04W 4/21 455/456.2 |
| 2016/0323248 | A1 | 11/2016 | Zeira |
| 2016/0353503 | A1 | 12/2016 | Folske et al. |
| 2017/0038847 | A1 | 2/2017 | Schorsch |
| 2017/0302750 | A1 * | 10/2017 | Greenberger ........... H04L 67/26 |
| 2018/0176736 | A1 | 6/2018 | Hong |
| 2018/0249293 | A1 | 8/2018 | Doherty |

OTHER PUBLICATIONS

IBM Appendix P, list of patents and patent application treated as related, FIle Herewith, 2 pages.

* cited by examiner

DYNAMICALLY CREATING FITNESS GROUPS

BACKGROUND OF THE INVENTION

The present invention relates generally to the field of mobile device location monitoring, and more particularly to the use of a server-based application to receive and manage a user request from a mobile computing device to determine an appropriate nearby exercise partner engaged in a specified exercise activity.

A rapid growth of the market for activity tracking devices, fitness apps, and associated products and services for monitoring and recording fitness activity is occurring. Activity tracking devices such as Fitbit Tracker® are wireless-enabled wearable technology devices for tracking a user's activity level. Activity trackers may record various measures of fitness activity or exercise such as a number of steps taken by a user, a user heart rate, a user's location, a rate of change or speed of a user's motion, and other user-related exercise metrics. Activity tracking devices may be associated or coupled with mobile apps, other computer programs and databases in various computing devices to collect, analyze, and store activity related data.

Numerous activity tracking apps that track and record fitness related activities are available to mobile device users. Activity tracking devices and activity tracking apps on mobile devices such as smart phones may access fitness services provided by a cloud service or a client-server computing system. Various fitness services allow users to store and analyze exercise performance data. Some fitness apps or activity tracking apps access databases and/or server-based programs that share exercise workouts, such as running routes with other individuals. Additionally, activity tracking apps accessing a server-based application, may publish individual performance data and post leader boards for activities such as running, cycling, weight lifting, and the like. Some activity tracking apps may enable users to provide comments, encouragement, coaching, and in some cases, to issue challenges to other users.

SUMMARY

Embodiments of the present invention disclose a method, a computer program product, and a system to locate computing device users to participate in a fitness activity. The method includes one or more computer processors receiving from a first computing device of a first user, a selection of a fitness activity and a request to locate at least one second computing device associated with at least one second user in a vicinity of the first computing device to join in a fitness activity. The method includes one or more computer processors determining the at least one second computing device associated with the least one second user is located in the vicinity of the first computing device. Furthermore, the method includes one or more computer processors determining directions for the first user and the at least one second user to meet.

DETAILED DESCRIPTION

Embodiments of the present invention recognize that numerous activity tracking devices, fitness apps, and associated fitness services track user fitness activities to monitor, analyze, and store individual exercise performance data, and preferred workouts including running and cycling routes. Embodiments of the present invention recognize that activity tracking devices and related fitness apps can provide tracking and sharing of individual workout performances with other users. Embodiments of the present invention recognize various individual performance levels in a group, sharing of workout routines, exercises, or routes for running, hiking, or cycling are shared using various activity tracking apps. Embodiments of the present invention recognize that activity tracking or fitness apps do not provide the ability for a user to request a program or an application to locate other nearby computing device users with a similar fitness level and/or engaged in a similar current exercise routine to join in a workout.

Embodiments of the present invention provide a method to create a dynamic or real-time workout group of two or more nearby computing device users, engaged in a fitness activity who are interested in exercising together. Embodiments of the present invention enable a user with a mobile device such as a smartphone with a fitness app to send a request to a program or an application to locate one or more nearby workout partners associated with a computing device or activity tracking device to join a workout group to exercise together. Embodiments of the present invention provide an ability to identify other nearby computing devices of users engaged in a similar fitness activity who are interested in working out with others who have a similar fitness level and/or in similar workout routine such as a similar running route. Embodiments of the present invention utilize an app on a mobile device or smart phone and a program or server-based application where a user requests the server-based application to identify one or more other nearby computing device users engaged in the same activity to join in a fitness activity.

Figure 1:
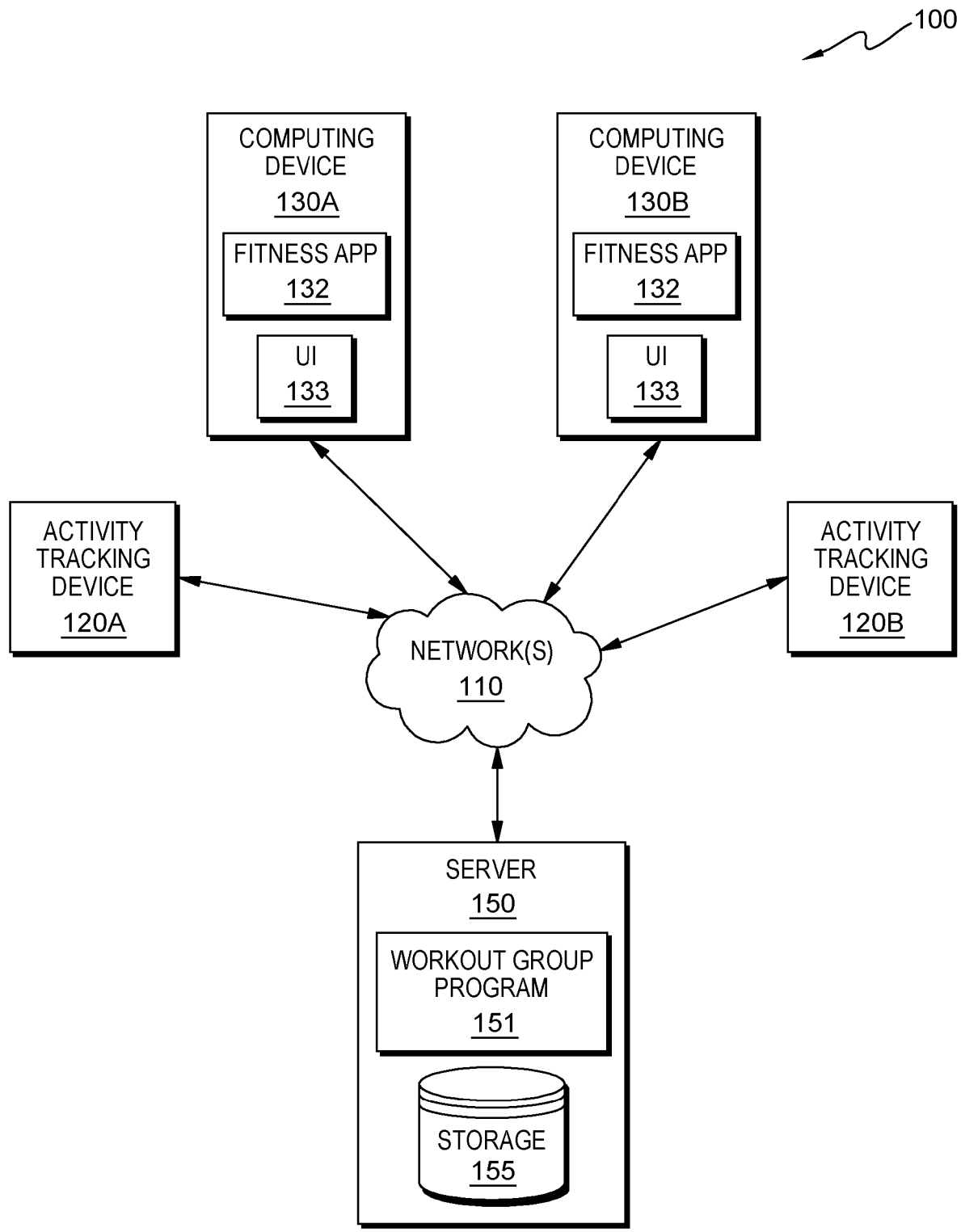
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Implementation of embodiments of the invention may take a variety of forms, and exemplary implementation details are discussed subsequently with reference to the Figures. Many modifications to the depicted environment may be made by those skilled in the art without departing from the scope of the invention as recited by the claims.

Distributed data processing environment 100 includes activity tracking devices 120A and 120B, computing device 130A and 130B, and server 150, interconnected over network 110. Network 110 can be, for example, a telecommunications network, a local area network (LAN), a wide area network (WAN), such as the Internet, or a combination of the three, and can include wired, wireless, or fiber optic connections. Network 110 can include one or more wired and/or wireless networks that are capable of receiving and transmitting data, voice, and/or video signals, including multimedia signals that include voice, data, and video information. In general, network 110 can be any combination of connections and protocols that will support communications between activity tracking devices 120A and 120B, computing devices 130A and 130B, server 150, and other computing devices (not shown) within distributed data processing environment 100.

Activity tracking devices 120A and 120B are any known fitness activity tracking devices. Activity tracking devices 120 may include location sensing devices, heart rate monitors, accelerometers, and other similar components included in an activity tracking device. Activity tracking devices 120A and 120B may be a wireless-enabled wearable device such as a wristband, a bracelet, a clip-on device such as a device clipped-on to a pocket or a waistband of the user's apparel, or any other device with any method of monitoring the physical activity of a user. In various embodiments, activity tracking devices 120A and 120B are coupled with a computing device such as a smart phone. In an embodiment, activity tracking devices 120A and 120B communicate with workout group program 151 on server 150 or another computer (not depicted) via network 110. In one embodiment, activity tracking devices 120A and 120B analyze digital images (e.g., digital video, static or dynamic digital heat images) or any other type of recording or method for tracking a user's movements to determine various measures of the user's activity. Activity tracking devices 120A and 120B receive and send data such as a user's location to computing devices 130A and 130B and server 150 via network 110. In various embodiments, each of activity tracking devices 120A and 120B are coupled with a mobile computing device such as computing devices 130A and 130B respectively. For example, activity tracking device 120A may be connected or coupled to computing device 130A. In an embodiment, activity tracking devices 120A and 120B are not present. For example, when computing device 130A and 130B are capable of monitoring a user's physical activity or change in location over time. In one embodiment, activity tracking devices 120A and 120B communicate directly with workout group program 151 to locate other users in the vicinity engaging in a similar fitness activity who are a good match to workout with and are interested in joining another user for the fitness activity.

Computing devices 130A and 130B can each be one or more of a smart phone, a wearable computing device such as a smart watch, a laptop computer, a tablet computer, or any programmable electronic device capable of communicating with various components and devices within distributed data processing environment 100, via network 110. In general, computing devices 130A and 130B each represent any programmable electronic device or combination of programmable electronic devices capable of executing machine readable program instructions and communicating with server 150, activity tracking devices 120A and 120B, and other computing devices (not shown) within distributed data processing environment 100 via a network, such as network 110. One or more computing devices such as computing devices 130A and 130B may be present in distributed data processing environment 100. As depicted, computing devices 130A and 130B each include an instance of fitness app 132 and user interface (UI) 133. In an embodiment, computing devices 130A and 130B include more than one fitness app.

In various embodiments, computing devices 130A and 130B are each respectively coupled to one of activity tracking devices 120A and 120B. For example, computing device 130A of a user (e.g., a smart phone) is coupled to activity tracking device 120A that is also coupled or worn by the user of computing device 130A. In an embodiment, computing devices 130A and 130B are not coupled to an associated activity tracking device and are capable of monitoring a user's physical activity or changes in a user's location over time. For example, computing device 130A associated with or carried by a user may determine and send physical activity data related to the user's movements or exercise such as a user's speed (e.g., the rate of change of a user's location), a change in elevation (e.g., running up a hill or jumping), a heart rate, or other exercise fitness data. Computing devices 130A and 130B can monitor exercise or fitness data such as speed, location changes, and the like that can be sensed (e.g., by analyzing location data, video, or other data) by a computing device such as a smart phone, tablet, or desktop computer.

Fitness app 132 resides on computing devices 130A and 130B. Fitness app 132 is any known fitness app utilized with mobile computing devices or smart phones (e.g., computing devices 130A and 130B). Fitness app 132 may provide a user of computing devices 130A and 130B the ability to create an account for tracking fitness related data associated with the user of the computing devices such as performances, measuring performance improvements by activity, course, or over a specified time period, accessing other user created workout routines, running routes and the like. Fitness app 132 may receive user inputs via UI 133, and may transmit data such as a workout routine detail to storage 155 on server 150. Fitness app 132 on computing devices 130A and 130B may send and receive data from computing devices 130A and 130B, activity tracking devices 120A and 120B, and server 150 via network 110. Fitness app 132 may be any available fitness app downloaded on computing devices 130A and 130B. In various embodiments, fitness app 132 is associated with an activity tracking device such as activity tracking devices 120A or 120B. In one embodiment, fitness app 132 is associated with more than one activity tracking device. One or more different fitness apps may be present in computing devices 130A and 130B. In an embodiment, fitness app 132 is capable of performing fitness activity tracking.

UI 133 provides an interface for a user of computing device 130A and 130B to interact with server 150. In one embodiment, UI 133 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, UI 133 may also be mobile application software that provides an interface between a user of computing device 130A and 130B or a user of server 150, a user of activity tracking devices 120A and/or 120B. UI 133 enables computing device 130A and 130B to display directions for users to meet from server 150. UI 133 may also enable computing device 130A and 130B to receive a user's request to join a workout group sent via server 150.

Server 150 can be a standalone computing device, a management server, a web server, a mobile computing device, or any other electronic device or computing system capable of receiving, sending, and processing data. In other embodiments, server 150 can represent a server computing system utilizing multiple computers as a server system, such as in a cloud computing environment. In another embodiment, server 150 can be a laptop computer, a tablet computer, a netbook computer, a personal computer (PC), a desktop computer, a personal digital assistant (PDA), a smart phone, or any programmable electronic device capable of communicating with computing devices 130A and 130B, and other computing devices (not shown) within distributed data processing environment 100 via network 110. In another embodiment, server 150 represents a computing system utilizing clustered computers and components (e.g., database server computers, application server computers, etc.) that act as a single pool of seamless resources when accessed within distributed data processing environment 100. Server 150 includes workout group program 151 and storage 155. Server 150 may include internal and external hardware components, as depicted and described in further detail with respect to FIG. 3.

Workout group program 151 determines a location of a requesting users computing device (e.g., computing device 130A) and a location of other computing devices in the general vicinity (e.g., within a range of one to ten miles) to determine nearby computing devices. Workout group program 151 determines a location of a computing device (e.g., computing device 130A) using any location determination method known to one skilled in the art. For example, workout group program 151 uses a GPS, a Wi-Fi® positioning system (WPS), an indoor positioning system, a hybrid positioning system using a combination of an indoor positioning system, or the like. In another example, workout group program 151 receives from computing device 130A a computing device location for a user determined based on a location determination of another device such as a fitness device or activity tracking device 120A or 120B.

Workout group program 151 determines one or more users of nearby computing devices, such as computing device 130B, engaged in the same exercise as a user of computing device 130A. Workout group program 151 determines if the users of other nearby computing devices engaged in the same exercise activity have a similar fitness level and/or engaged in a similar workout routine are interested in exercising together. When workout group program 151 receives a request to locate one or more computing devices of other users engaged in the same or similar exercise activity who would like to join a workout group or exercise with another user from fitness app 132, workout group program 151 determines or retrieves a location of the requesting user's computing device (e.g., computing device 130A). Workout group program 151 searches one or more databases on server 150 for computing devices of other users in the vicinity of the requesting user's computing device who have also input a request, for example, via fitness app 132 to join a workout group. A workout group as discussed with reference to embodiments of the present invention is more than one individual using a fitness app and/or activity tracking device (e.g., activity tracking device 120A and/or 120B) who exercise or perform a physical activity such as running together in a collaborative group.

Workout group program 151 retrieves, from a database, a fitness data such as user performance statistics, a current user workout routine, and/or user preferred workout routines such as a current cycling route. Workout group program 151 compares the retrieved fitness data of the user of computing device 130A requesting a workout group and the other identified users of nearby computing devices to determine if the requesting user and the other identified users have either a similar fitness level or are engaged in a similar workout routine (e.g., running the same route). If the retrieved fitness data indicates a good match (e.g., a similar fitness level or a similar current or preferred workout routine) then, workout group program 151 determines directions for the interested users with similar fitness data to meet and exercise together.

Workout group program 151 may send and receive data such as a user location or a request to join a workout group from computing devices 130A and 130B. In some embodiments, workout group program 151 may send and receive location data or requests to join a workout group to and from activity tracking devices 120A and 120B. Workout group program 151 on server 150 may send and receive fitness data from activity tracking devices 120A and 120B. In some embodiments, workout group program 151 receives fitness data from computing devices 130A and 130B. In various embodiments, workout group program 151 retrieves fitness data such as fitness statistics and preferred workouts associated with a user from a database, for example in storage 155 on server 150. In various embodiments, workout group program 151 retrieves user related information from a user created account (e.g., created via fitness app 132) from one or more databases in storage 155. In an embodiment, workout group program 151 and storage 155 are included in a fitness service on server 150. Workout group program 151 is depicted and described in further detail with respect to FIG. 2.

Storage 155 resident in server 150 is a repository for fitness related information provided by activity tracking devices 120A and 120B, computing devices 130A and 130B, in addition to a plurality of other computing devices of other users (not depicted). Storage 155 can receive, retrieve, and store data such as computing device or activity tracking device locations and associated user fitness performance data. Storage 155 may include one or more databases capable of storing, organizing, and accessing data for server 150 and workout group program 151. Storage 155 may reside on one or more computing devices or servers (e.g., resides in a cloud-computing environment).

Figure 2:
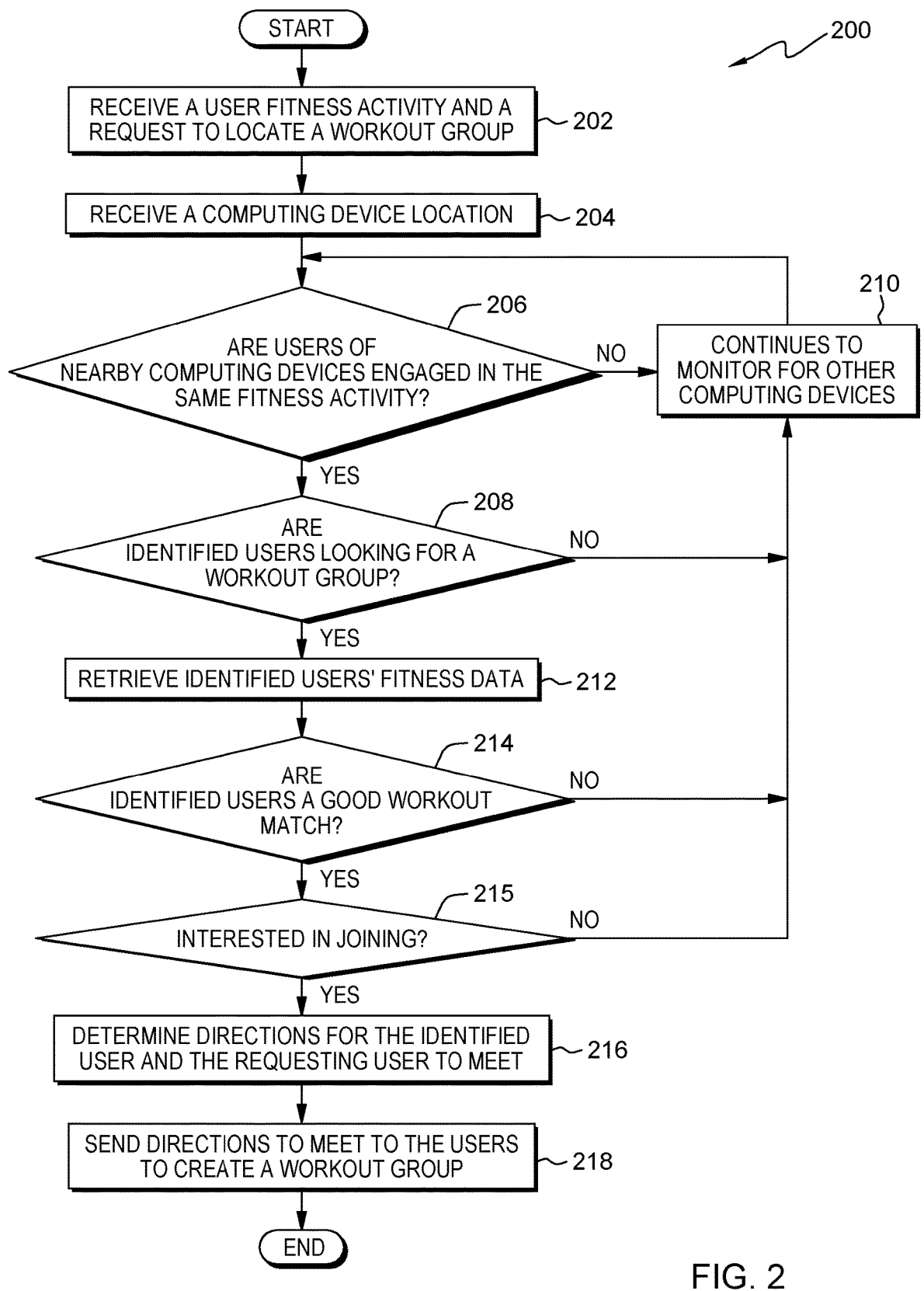
FIG. 2 is a flowchart depicting operational steps of a workout group program, on a server computer within the distributed data processing environment of FIG. 1, for locating workout partners based on identifying other interested users of nearby computing devices, in accordance with an embodiment of the present invention.

FIG. 2 is a flowchart 200 depicting operational steps of workout group program 151, on server 150 within the distributed data processing environment 100 of FIG. 1, for locating workout partners based on identifying other interested users of nearby computing devices, in accordance with an embodiment of the present invention.

Workout group program 151 receives a user selection of a fitness activity and request to join a workout group (202), for example, from fitness app 132 on computing device 130A. A fitness activity includes any exercise activity such as running, cycling, weight lifting, kayaking, and the like along with any other physical recreational activities such as walking, golf, tennis, bocce, dance, and the like. In one embodiment, workout group program 151 receives from a user with an account, created via a web or mobile app in a fitness service, a request to locate a nearby workout partner with a similar fitness level and/or engaged in a similar workout routine to join in exercising. A user of computing device 130A may select a line in a menu titled "looking for a workout group" on UI 133 in fitness app 132. In an embodiment, workout group program 151 receives from a user of fitness app 132 on computing device 130A engaging in a fitness activity such as running an indication of an interest in joining a workout group, for example, by selecting an icon, an option in a menu, or any other user input indicating an interest in locating a workout group. A workout group may be an existing group of two or more users performing a fitness related activity or exercise such as running, biking, kayaking, tennis, weight lifting, yoga, or the like. A workout group may be created for example, using workout group program 151, as two or more users engaged in the same activity meet to exercise or participate in a fitness activity such as walking together. In various embodiments, workout group program 151 receives a request from an exercising user engaged in a fitness activity to locate one or more other users (e.g., a user of computing device 130B) to join in exercising or a fitness activity. In an embodiment, workout group program 151 receives a request from a user planning on initiating a fitness activity in a relatively short time (e.g., in 5 minutes) and would like to locate another user who is just starting or is planning on starting a similar fitness activity or a similar exercise routine in a relatively short time. In an embodiment, workout group program 151 receives from computing device 130A, at least, a user selection of a type of activity (e.g., running, biking, tennis, etc.) and a selection of an icon or menu option such as "looking for a workout group." For example, workout group program 151 receives a user pull-down menu selection for running as an activity and a selection of an icon indicating an interest in running with other users. In an embodiment, workout group program 151 receives a user selection of specific desired workout selection. For example, workout group program 151 receives a user input on UI 133 indicating a specific workout the user wants to engage in such as a specific running route such as Central Park West Trail, or a specific type of workout such as running hills with multiple elevation changes or skiing moguls. In one embodiment, activity tracking devices 120A and 120B determine and send to workout group program 151 a specific type of activity such as running hills or skiing moguls based on one of a received user input or sensor input (e.g., accelerometer data, altimeters, etc.).

Workout group program 151 receives a computing device location (204) for computing device 130A of the user requesting to joining a workout group. In various embodiments, workout group program 151 receives a user location, such as a global positioning system (GPS) coordinate, determined by the user's computing device 130A using one or more location determination of techniques known in the art to detect the presence of a computing device, such as computing device 130A. For example, workout group program 151 receives a location of computing device 130A determined using any known location determination method such as GPS, Wi-Fi® positioning system (WPS), an indoor positioning system, a hybrid positioning system using a combination of an indoor positioning system, or the like. In another example, workout group program 151 receives from computing device 130A a user location determined based on a location determination of another device such as a fitness device such as activity tracking device 120A on the user or a smart watch. In one embodiment, the function and code of workout group program 151 is included in activity tracking device 120A or 120B. In an embodiment, the function and code of workout group program 151 is in computing devices 130A and 130B.

Workout group program 151 determines whether users of nearby computing devices are engaged in the same fitness activity (decision 206) as the user of computing device 130A. In one embodiment, workout group program 151 receives from computing device 130A or 130B a user input indicating an intent to begin a workout in an indicated time (e.g., in ten minutes) and searches for another nearby computing device of a user just beginning a workout or intending to exercise with the same activity at a similar time. Workout group program 151 identifies any nearby computing devices by one or more of several methods using known location sensing devices and techniques. Workout group program 151 can retrieve a location for computing device 130A (i.e., received in step 204) as discussed above from a database in storage 155. In various embodiments, workout group program 151 is configured with a pre-set range or a maximum distance from the location of computing device 130A, based at least in part, on a user fitness activity.

A range is a range of distance or a maximum distance, for example, from a location of an object such as from computing device 130A. A computing device of a nearby user may be in a pre-determined range determining an area around computing device 130A or a zone around computing device. For example, a zone may be defined as a location within a distance radius of computing device 130A or within a circular area around an identified computing device of a user interested in joining a workout group. In another example, a zone may be defined by GPS coordinates of a perimeter of the zone.

In an embodiment, workout group program 151 includes a list or a table with each fitness activity and an associated range or maximum distance of another computing device to determine if a computing device is nearby computing device 130A. For example, the user of computing devices 130A and 130B are cycling, and a range of two miles is associated in the list or table with cycling to determine if a computing device and an associated user are in the vicinity of computing device 130A. Workout group program 151 is configured to identify if a cyclist who is a user of computing device 130B is in the vicinity of computing device 130A by determining if computing device 130B is at a location within a two mile radius of the location of computing device 130A. In another example, workout group program 151 is configured to locate nearby computing devices using a range of 500 yards from the user of computing device 130A skiing on a ski mountain based, at least in part, on a maximum range extracted from the list or table in workout group program 151. In one embodiment, workout group program 151 retrieves the range associated with a fitness activity from a list or table stored in a database in another location such as storage 155. In various embodiments, workout group program 151 is configured with a range or a radius of a set length based on an activity of the user of computing device 130A (e.g., two miles for cycling) around a user of computing device 130A who is requesting to locate another user to join a workout group. For example, workout group program 151 determines if another computing device is in a location within the determined range (e.g., two miles for a user of computing device who is cycling) of computing device 130A.

In another embodiment, workout group program 151 determines a user in the vicinity of computing device 130A using a time required to meet or join up with one or more other users interested in working out in a group. For example, workout group program 151 may receive a user selection or input of a time such as five minutes to meet another user via UI 133 in fitness app 132 on computing device 130A. In an embodiment, workout group program 151 uses a received activity selection in step 202, to determine a range or a zone for locating other nearby users engaging the same activity based, on the selected time and the current fitness activity. For example, when a user of computing device 130A engaged in cycling selects a time of five minutes, workout group program 151 uses the retrieved activity (cycling) and the selected time (five minutes), and accesses a record or a list of ranges associated with an activity in workout group program 151 or retrieved from a database in storage 155 to determine a range. For example, workout group program 151 is configured to use a range of 1.5 miles for users cycling. In another example, workout group program 151 retrieves a range associated with an exercise activity from a database or a table with a list of fitness activities, a list of times, and an associated distance for the user selected activity and the user selected time.

In an embodiment, workout group program 151 determines a range or a zone for locating other nearby users based, at least in part, on an analysis the user performance statistics retrieved from a database and a user selected time to meet. For example, workout group program 151 determines a range for locating nearby computing devices of users performing the same fitness activity based on an analysis of the extracted fitness data or workout statistics for the user of computing device 130A retrieved from a database for the user selected or current user activity. For example, workout group program 151 retrieves from storage 155 an average cycling speed associated with the user of computing device 130A. Using a retrieved average cycling speed of 20 miles per hour for the user of computing device 130A and a user selection of five minutes to meet would result, for example, in a range of 1.7 miles to identify other computing devices of users who may be met in five minutes or less. The computing devices within two miles of computing device 130A may be considered nearby computing devices that are in the vicinity of computing device 130A in this example.

In one embodiment, workout group program 151 determines one or more computing devices in the vicinity of a user interested in joining a workout group based, at least in part, on one or more user selected locations. For example, workout group program 151 receives a user selection of an address for two parks with tennis courts and has a configured pre-set distance of three hundred yards as a range for tennis (the selected fitness activity). Based on the two received addresses and/or associated GPS locations and the range of three hundred yards for locating computing devices of other users engaging in tennis, workout group program 151 locates three user of computing devices engaging in tennis with a location or locations within the range of the first park and no users of computing devices engaging in tennis in the range of the second park. In this example, workout group program 151 identifies three computing devices of user engaged in tennis at the first location.

In various embodiments, workout group program 151 retrieves the user selection of a fitness activity the user of computing device 130A is engaged in (e.g., the user's current fitness activity provided in step 202). For example, workout group program 151 may retrieve the user's current fitness activity from a database in storage 155 or from a register or temporary storage location within workout group program 151. In an embodiment, workout group program 151 sends a request to fitness app 132 in nearby computing devices in the general area (e.g., a town or a twenty mile radius of computing device 130A) to identify if the users of the computing devices indicated the same current fitness activity (e.g., running) as the user of computing device 130A. In one embodiment, workout group program 151 polls a database in storage 155, to retrieve a record containing user fitness activity and associated computing device locations for the users to determine other users engaged in the same fitness activity and the location associated with the users engaged in the same fitness activity. In another example, workout group program 151 queries server 150 in a cloud-service hosting one or more databases in storage 155 containing user provided current fitness activity (e.g., running) used to determine when users of other computing devices (e.g., computing device 130B) are engaging in the same fitness activity (e.g., running) as the user of computing device 130A.

When workout group program 151 does not determine that any of the users of nearby computing devices are engaged in the same fitness activity (no branch decision 206) then, workout group program 151 continues to monitor for other computing devices (210). Workout group program 151 continues to try to locate other computing devices in the identified zone (e.g., located within a determined distance or radius from the requesting user's computing device) to determine a user performing the same fitness activity.

Responsive to determining that the users of nearby computing devices are engaged in the same fitness activity (yes branch of decision 206), workout group program 151 determines whether the identified users are looking for a workout group (decision 208). Using one or more methods, workout group program 151 determines if any user of the one or more identified nearby computing devices engaging in the same activity as the user of computing device 130A, determined in step 206, has indicated an interest in joining a workout group. For example, in one method, workout group program 151 queries a database in storage 155 to determine if the one or more identified users in the vicinity of computing device 130A indicated an interest in joining a workout group. As discussed earlier in step 202, a user selection of a menu item or an icon representing a user's interest in locating other users to working out or run with may be stored in a database in storage 155. Workout group program 151 queries a database to determine if the identified users have selected to join a workout group. For example, workout group program 151 may send a list of users meeting previously discussed requirements to join a workout group (i.e., engaged in the same activity as the user of computing device 130A) to database in storage 155 in a query requesting identification of the users from the list who have indicated an interest in joining a workout group. Workout group program 151 may include the user of computing device 130B in a query to determine if the user of computing device 130B has selected to join a workout group, responsive to an affirmative or positive response to the query indicating the user did select to join a workout group, workout group program 151 moves to the next step or step 216. In embodiments, workout group program 151 queries fitness app 132 on each of the identified users computing devices that meet previous requirements to determine if a selection to join a workout group has been made.

Responsive to receiving a reply to the query indicating none of one or more users of the identified nearby computing devices is interested in joining a workout group (no branch decision 208), workout group program 151 continues to monitor the area for other nearby computing devices of users looking for a workout group (210). Workout group program 151 continues to monitor the zone or area determined previously by a range in step 206 to identify nearby computing devices of users engaged in the same fitness activity. Workout group program 151 returns to step 206 to identify nearby computing devices engaged in the same fitness activity as the user of computing device 130A.

Responsive to receiving a reply to the query indicating at least one of the identified users is interested in joining a workout group (yes branch decision 208), workout group program 151 retrieves the identified users' fitness data (212), for example, from a database in storage 155 on server 150. The retrieved fitness data may include fitness performance statistics associated with a user and/or exercise preferences of a user. Fitness performance statistics may include but are not limited to an average workout time, an average workout performance, a highest achieved level for a specific fitness target or activity, and workout performance goals. Exercise preferences may include but are not limited to a preferred workout routine, a preferred workout route, a preferred workout location, a preferred workout time of day, and a preferred type of training regime. For example, workout group program 151 retrieves fitness data associated with running for each of the identified users interested in joining a workout group including an average training speed, an average run distance, a maximum training distance, a preferred time of day to run, a preferred running route, a preferred training regimen (e.g., hills, interval runs, speed workout, easy run, etc.), and other similar running statistics for each of the users.

Workout group program 151 compares the retrieved fitness data to determine whether the identified users have a similar fitness level (decision 214). Workout group program 151 compares the fitness data of the identified users of nearby computing devices to the fitness data for the same activity as the user of computing device 130A to see if they have a similar fitness level and therefore, would be a good match to form a workout group or to join an existing workout group. In an embodiment, workout group program 151 is configured to use a pre-determined set of fitness data to be compared. For example, workout group program 151 retrieves from a database fitness data for an average workout, an average length of a workout, and a preferred time of day to workout. In another example, the user of computing device 130A is playing golf, workout group program 151 may be configured to retrieve and compare the identified users handicap to the user of computing device 130A's handicap for a golf course to determine if the players are at a similar performance level to join up and play a round of golf. If the handicap of the identified user is within 10% of the handicap of the user of computing device 130A, then workout group program 151 determines that the identified user has a similar skill level (e.g., would be a good match to play a round of golf with the user of computing device 130A).

In another embodiment, workout group program 151 is configured to allow the user of computing device 130A to select one or more elements of the fitness data to use in determining if the identified users and the user of computing device 130A have a similar fitness level and are a good match to join a workout group. For example, a runner who is a user of computing device 130A interested in joining a workout group selects an average distance of ten miles for a run and an average runtime of eighty minutes for a ten mile run. Workout group program 151 may be configured to determine that an identified user is a good match to run with the user of computing device 130A when the average time for a ten mile run is within 5% of the fitness data of computing device 130A.

In another embodiment, workout group program 151 determines that an identified user is a good match to join a workout group with the user of computing device 130A when at least one half of the identified user's fitness statistics are within 15% of the fitness statistics of the user of computing device 130A.

In various embodiments, workout group program 151 determines users have a similar fitness level or are a good match to exercise together when the users are engaged in a similar current exercise routine (e.g., leg workout) or a similar current route for a fitness activity (e.g., the same running trail or long range archery target practice). Workout group program 151 retrieves, for example from storage 155, details on a current fitness activity such as a current exercise routine for the requesting user of computing device 130A and the user of computing device 130B in the vicinity of computing device 130A. Workout group program 151 compares the current exercise routines and/or current fitness activity routes to determine if the current exercise routines or current running routes are similar and provide a good match for the associated users to exercise together.

In an embodiment, workout group program 151 tracks the time a user has been engaged in an exercise activity to determine whether the user is a good match for working out with the user of computing device 130A requesting to join a workout group. For example, workout group program 151 tracks the time elapsed since a user selection of an icon such as "beginning to exercise" in fitness app 132 from computing devices 130A and 130B. Workout group program 151 determines whether both users of computing devices 130A and 130B have a similar amount of time remaining for the selected exercise activity (e.g., based on an analysis of retrieved fitness data such as a selected running route or weight lifting routine). Based, at least in part, on a determination of a similar amount of exercise time remaining, workout group program 151 determines that the users of computing devices 130A and 130B are a good match to workout or exercise together.

Responsive to determining that the identified user does not provide a good workout match (no branch of decision 214) then, workout group program 151 continues to monitor for other computing devices (210). Workout group program 151 monitors an area in the vicinity to computing device 130A to identify nearby computing devices of users engaged in a fitness activity as previously discussed in step decision 206.

Responsive to determining the identified user is a good workout match (yes branch decision 214), then, workout group program 151 determines whether an identified user, for example the user of computing device 130B, is interested in joining (decision 215) the requesting user of computing device 130A in a workout group. In various embodiments, workout group program 151 sends a message to the computing devices of each of the identified users meeting the criteria discussed in steps 202-214 to determine if the identified users would like to join a workout group. For example, workout group program 151 sends a message to the user of computing device 130B such as a short messaging service (SMS), an e-mail, a text message, or any other known type of message to request if the user of computing device 130B is interested in joining a workout group, including a message via a social networking application or within a fitness application, such as fitness app 132. Responsive to not receiving at least one positive reply (e.g., receiving only one or more negative replies or non-responses) indicating that the identified users of computing devices receiving messages are not interested in joining a workout group (no branch of decision 215) then, workout group program 151 proceeds to step 210 to continue to monitor for other computing devices and continues on to step decision 206 as required to identify nearby computing devices of other users engaged in the same fitness activity as the user of computing device 130A.

Responsive to receiving a positive response or reply from the user of computing device 130B receiving the message indicating the nearby user's interest in joining a workout group (yes branch of decision 215) then, workout group program 151 determines directions for the identified user and the requesting user to meet (step 216). For example, when workout group program 151 receives a positive response to the message, e-mail, or text from computing device 130B, workout group program 151 may query a database in storage 155 to retrieve a location for computing device 130B. In an embodiment, workout group program 151 may query each of computing devices 130A and 130B to receive a current location for computing devices 130A and 130B. In an embodiment, based on the location of the requesting user (e.g., the user of computing device 130A) and location of a user of computing device 130B using known mapping techniques, mapping programs or apps, workout group program 151 determines directions for the user of computing device 130A and the user of computing device 130B to meet. For example, when two cyclists are determined to be have a similar fitness level or cycle at a similar average speed for a workout, then workout group program 151 sends direction to meet to the users to meet to create a workout group (218). Workout group program 151 sends a message to the user of computing device 130A to slow down to 15 kilometer/hour for three minutes to join Liam, the user of computing device 130B. The determination of directions for each of the identified user of computing devices meeting the above criteria may be determined sequentially or may be determined simultaneously depending, for example, on available computing resources.

In one embodiment, workout group program 151 sends a location of computing device 130A to computing device 130B and a location of computing device 130B to computing device 130A so that computing devices 130A and 130B provide directions for the respective users to meet. For example, workout group program 151 sends location data for computing device 130B such as a GPS co-ordinate or a latitude and longitude to computing device 130A. The user of computing device 130A inputs the GPS co-ordinate in a known mapping app and receives directions to meet the user of computing device 130B via UI 133. In one embodiment, workout group program 151 resident on a computing device (e.g., computing device 130A) uses the retrieved location for another computing device (e.g., computing device 130B) and accesses known mapping apps to provide directions for the user of computing device 130A to meet the user of computing device 130B. Workout group program 151 may retrieve a location of computing device 130B from storage 155 and, using a known mapping apps, provides to a user of computing device 130A directions to meet the user of computing device 130B displayed on UI 133.

In one embodiment, in the event of no response from the user of computing device 130B, workout group program sends directions to meet with the user of computing device 130A to the user of computing device 130B and directions to meet the user of computing device 130B to the user of computing device 130A. For example, the user of computing device 130A, Jane, hitting at a warm-up wall in a tennis center indicates, in workout group program 151, an interest in meeting another player for a set of tennis. Sue, a user of computing device 130B, interested in another set of tennis, did not respond to a message from workout group program 151, is finishing up a game with another player on court 6 and receives a message from workout group program 151 with directions to meet Jane in ten minutes on court 3. Jane receives directions from workout group program 151 to meet Sue on court 3 in ten minutes to play a set of tennis. In an embodiment, the users receiving directions send a confirmation to workout group program 151 of an intent to meet at the location as directed. In response to receiving a confirmation from a user to join the workout group, workout group program 151 sends a notice to the other user communicating a specific user's intent to join the workout group. In the case where a user has not confirmed joining a workout group in a pre-determined time, for example, 5 minutes before the meeting, workout group program 151 is configured to send another message to the non-responsive user requesting a confirmation.

In the event of a fitness activity such as tennis with a limitation of a number of participants or a user input limitation such as one other runner to run with input by user to workout group program 151 when multiple compatible users of computing devices are identified in the vicinity of the user of computing device 130A, workout group program 151 sends a request to each of the compatible users of computing devices in the vicinity of computing device 130A and upon receiving a first response from a user or the first number affirmative responses corresponding the limitation input by the user or inherent to the activity (e.g., configured in workout group program 151), then workout group program 151 determines directions for the first affirmative responding users (e.g., within the limited number of users for the activity) to meet with the user of computing device 130A. Upon receiving additional affirmative responses from more users than the number of users specified or limited by the requesting user or the selected fitness activity, workout group program 151 sends a notification to each of additional users indicating an interest in exercising with the user of computing device 130A that the user of computing device 130A is engaged with other users and may join you next time.

The method described above for the operational steps of workout group program 151 (e.g., steps 204-218) can be repeated, as necessary or as desired, to find additional users with similar fitness levels who would like to join a workout group. In one embodiment, a user of computing device 130A turns off or disables the "looking for a workout group selection" when a group of a desired size is formed. For example, a weightlifter desires to locate a single workout partner for his or her workout group. In another example, in cycling, the addition of multiple additional riders of similar cycling speeds or fitness levels may result in a peloton. A peloton is a large group of cyclist benefiting from drafting to conserve energy while riding or racing that benefits from the continued addition of additional cyclists interested in working together in a collaborative cycling group.

In various embodiments, workout group program 151 is configured to perform the yes branches of decision steps 206, 208, 214, and 215 in another order. While step 212 is performed at some time before step 214, the yes branches of decision steps 206, 208, 214, and 215 may be performed in another order. For example, performing decision step 215 after step 204, followed by step decision step 208, then, decision step 206, and finally decision step 214 preceded by step 212 would result in the same identified user and associated user computing devices for workout group program 151 to determine and to send directions to meet in a workout group. Workout group program 151 is configured to meet identified criteria before determining directions for one or more matched workout users of nearby computing devices to meet. In various embodiments, workout group program 151 is configured to include the following criteria as identified criteria: the nearby computing devices are computing devices of users engaged in the same exercise activity, the users of the nearby computing devices engaged in the same exercise activity are looking for a workout group to join in the same exercise activity, and the users of nearby computing devices engaged in the same activity are a good match for working out together. Workout group program 151 determines, in any order, that one or more users of nearby computing devices engaged in the same activity meet the identified criteria. In various embodiments, the identified criteria determined in order for workout group program 151 to provide directions to one or more users of nearby computing devices who meet the identified criteria include the yes branches of decision steps 206, 208, 214, and 215 in FIG. 2. For example, workout group program 151 determines in any order that each of decision steps 206, 208, 214, and 215 are met (e.g., yes branches of decision branches of decision steps 206, 208, 214, and 215 are followed or in effect).

Figure 3:
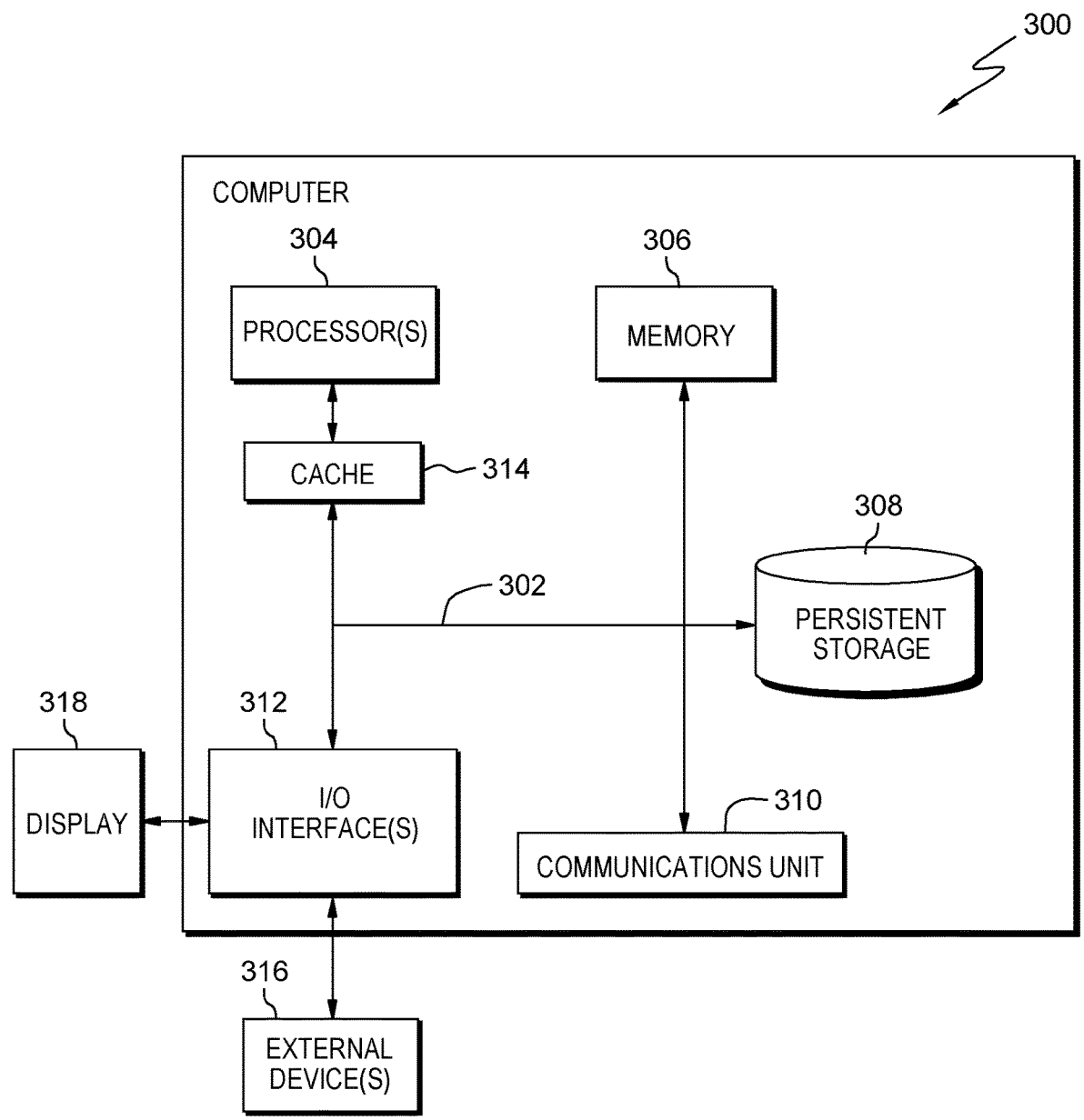
FIG. 3 depicts a block diagram of components of the server computer executing the workout group program within the distributed data processing environment of FIG. 1, in accordance with an embodiment of the present invention.

FIG. 3 depicts a block diagram 300 of components of server 150 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server 150 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In an embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., workout group program 151 are stored in persistent storage 308 for execution and/or access by one or more of the respective processor(s) 304 of server 150 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices depicted in FIG. 1, including resources of computing devices 130A and 130B. In these examples, communications unit 310 includes one or more network interface cards. Communications unit 310 may provide communications through the use of either or both physical and wireless communications links. Workout group program 151 may be downloaded to persistent storage 308 of server 150 through communications unit 310.

I/O interface(s) 312 allows for input and output of data with other devices that may be connected to server 150. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., workout group program 151 and storage 155 on server 150, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touchscreen, such as a display of a tablet computer.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
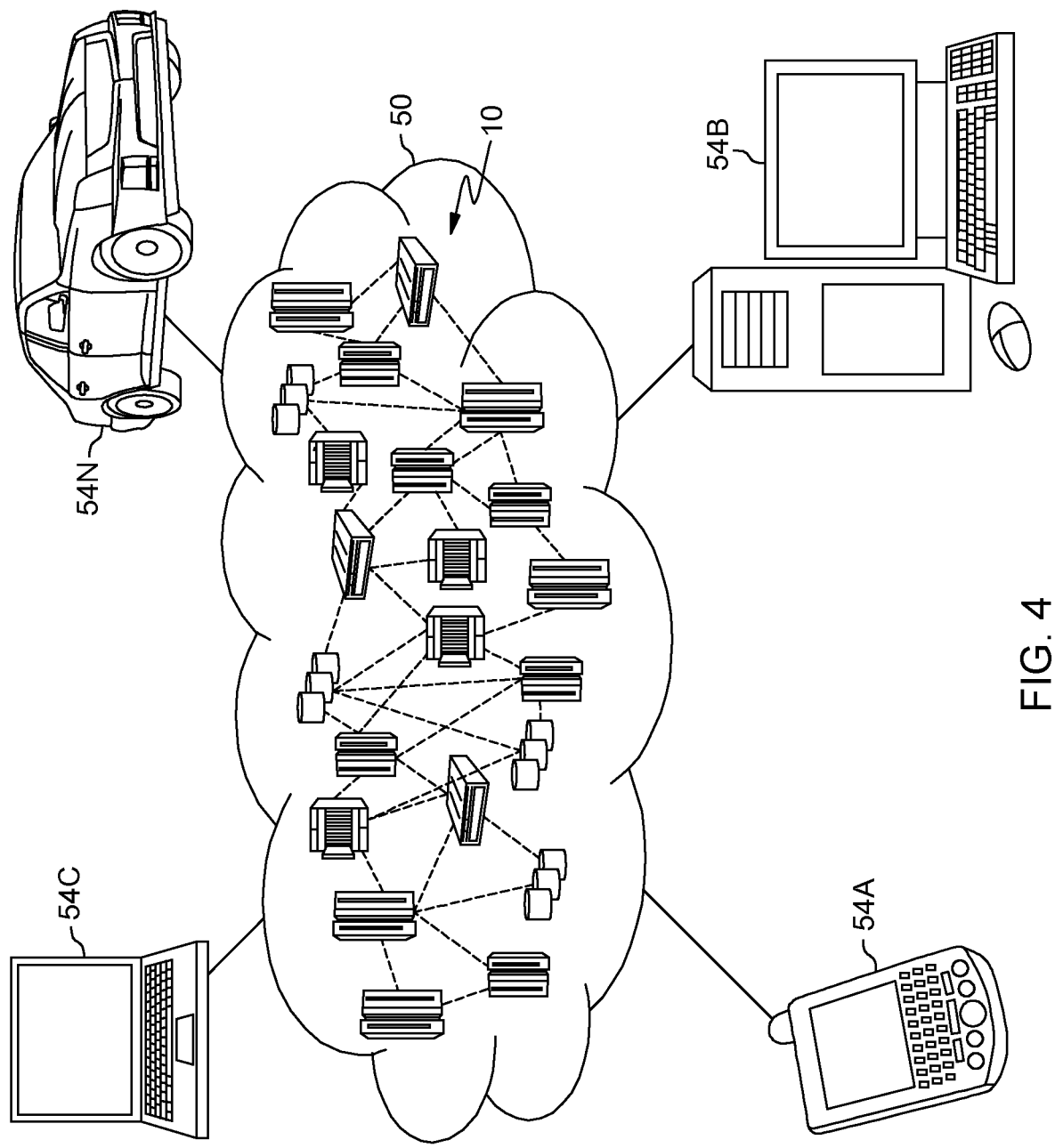
FIG. 4 depicts a cloud computing environment in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that cloud computing nodes 10 and cloud computing environment 50 can communicate with any type of computerized device over any type of network and/or network addressable connection (e.g., using a web browser).

Figure 5:
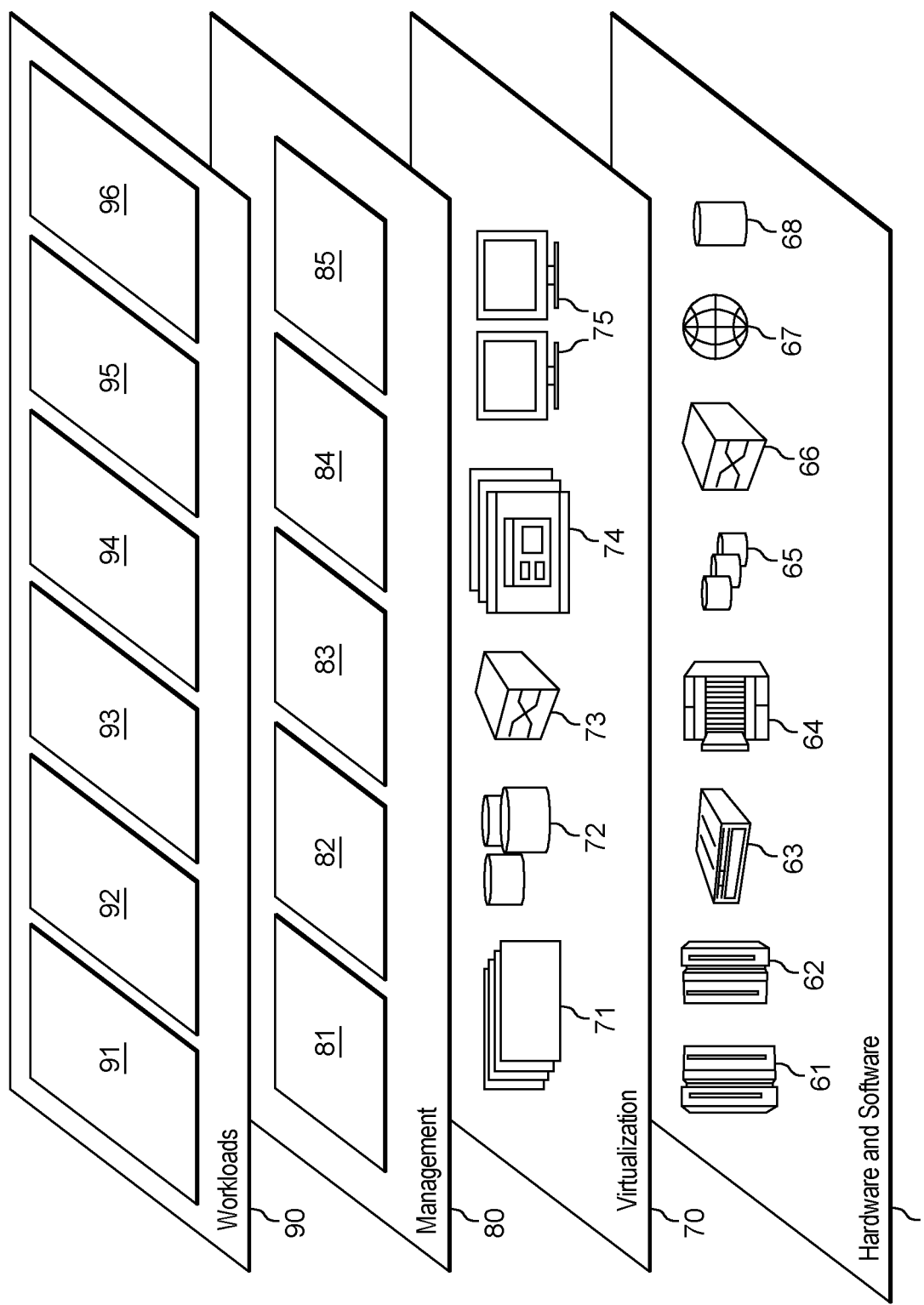
FIG. 5 depicts abstraction model layers in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workout group program 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method to locate computing device users to participate in a fitness activity, the method comprising:
   receiving, by one or more computer processors, from a first computing device of a first user, a selection of a fitness activity and a request to locate at least one second computing device associated with at least one second user in a vicinity of the first computing device to join in a fitness activity;
   receiving the request to locate at least one second computing device associated with the at least one second user who is planning on initiating the fitness activity in a relatively short time;
   locating each of the at least one second computing device associated with the at least one second user who is planning on initiating the fitness activity in the relatively short time;
   determining, by one or more computer processors, the at least one second computing device associated with the least one second user located in the vicinity of the first computing device; and
   determining, by one or more computer processors, directions for the first user and the at least one second user to meet.

2. The method of claim 1, further comprises sending, by one or more computer processors, the directions to meet to the first computing device of the first user and to the at least one second computing device associated with the at least one second user.

3. The method of claim 1, wherein determining the least one second computing device associated with the least one second user located in the vicinity of the first computing device further comprises determining, by one or more computer processors, the at least one second user is engaged in a similar fitness activity as the first user of the first computing device.

4. The method of claim 1, wherein determining the least one second computing device associated with the least one second user located in the vicinity of the first computing device further comprises determining, by one or more computer processors, that the at least one second user is looking for one or more other exercising users to join in exercising.

5. The method of claim 1, further comprising:
   responsive to determining the at least one second computing device associated with the at least one second user is not located in the vicinity of the first computing device, monitoring, by one or more computer processors, a plurality of locations in the vicinity of the first computing device to locate one or more additional computing devices associated with an additional user in the vicinity of the first computing device.

6. The method of claim 1, further comprising:
   tracking, by one or more computer processors, a time elapsed since the selection of the fitness activity;
   retrieving, by one or more computer processors, the time elapsed since the selection of the fitness activity from the first user of the first computing device and the at least one user of the at least one second computing device;
   retrieving, by one or more computer processors, an average workout time for the first user of the first computing device and the at least one second user of the at least one second computing device;
   determining, by one or more computer processors, that a time remaining in the average workout time is similar for the first user of the first computing device and the at least one second user of the at least one second computing device.

7. The method of claim 1, wherein determining the location of the at least one second computing device is within the range associated with the fitness activity and the location of the first computing device comprises:
   receiving, by one or more computer processors, a user selection of a time to meet;
   retrieving, by one or more computer processors, a plurality of user performance statistics associated with the fitness activity for the first user of the first computing device and the least one second user of the at least one second computing device; and
   determining, by one or more computer processors, that the first user of the first computer device and the at least one second user of the at least one second computer device can meet at the time to meet based, at least in part, on an analysis of the plurality of user performance statistics associated with the fitness activity of the first user of the first computing device and the least one second user of the at least one second computing device.

8. The method of claim 1, further comprises:
   retrieving, by one or more computer processors, a plurality of user performance statistics associated with the fitness activity the first user of the first computing device and the least one second user of the at least one second computing device; and
   determining, by one or more computer processors, that at least one half of the plurality of user performance statistics associated with the fitness activity of the first user of the first computing device and at least one half of the plurality of user performance statistics associated with the least one second user of the at least one second computing device are within a pre-determined percentage.

9. The method of claim 1, wherein receiving from the first computing device of the first user, the selection of the fitness activity and the request to locate at least one second computing device associated with the at least one second user in the vicinity of the first computing device to join in the fitness activity comprises:
   receiving, by one or more computer processors, the request to locate at least one second computing device associated with the at least one second user who is planning on initiating the fitness activity in a relatively short time;
   locating, by one or more computer processors, each of the at least one second computer associated with the at least one second user who is planning on initiating the fitness activity in the relatively short time.

10. A computer program product comprising:
one or more computer readable storage media and program instructions stored on the one or more computer readable storage media, the program instructions executable by a processor, the program instructions comprising instructions for:
receiving from a first computing device of a first user, a selection of a fitness activity and a request to locate at least one second computing device associated with at least one second user in a vicinity of the first computing device to join in a fitness activity;
receiving the request to locate at least one second computing device associated with the at least one second user who is planning on initiating the fitness activity in a relatively short time;
locating each of the at least one second computing device associated with the at least one second user who is planning on initiating the fitness activity in the relatively short time;
determining the at least one second computing device associated with the least one second user located in the vicinity of the first computing device; and
determining directions for the first user and the at least one second user to meet.

11. The computer program product of claim 10, further comprises sending the directions to meet to the first computing device of the first user and to the at least one second computing device associated with the at least one second user.

12. The computer program product of claim 10, wherein determining the least one second computing device associated with the least one second user located in the vicinity of the first computing device further comprises determining the at least one second user is engaged in a similar fitness activity as the first user of the first computing device.

13. The computer program product of claim 10, wherein determining the least one second computing device associated with the least one second user located in the vicinity of the first computing device further comprises determining the at least one second user is looking for one or more other exercising users to join in exercising.

14. The computer program product of claim 10, further comprising:
responsive to determining the at least one second computing device associated with the least one second user is not located in the vicinity of the first computing device, monitoring a plurality of locations in the vicinity of the first computing device to locate one or more additional computing devices associated with an additional user in the vicinity of the first computing device.

15. The computer program product of claim 10, further comprising:
tracking a time elapsed since the selection of the fitness activity;
retrieving the time elapsed since the selection of the fitness activity from the first computing device and the at least one second computing device;
retrieving an average workout time for the first user of the first computing device and the at least one second user of the at least one second computing device;
determining that a time remaining in the average workout time is similar for the first user of the first computing device and the at least one second user of the at least one second computing device.

16. A computer system comprising:
one or more computer processors;
one or more computer readable storage media; and
program instructions stored on the one or more computer readable storage media for execution by at least one of the one or more computer processors, the program instructions comprising instructions for:
receiving from a first computing device of a first user, a selection of a fitness activity and a request to locate at least one second computing device associated with at least one second user in a vicinity of the first computing device to join in a fitness activity;
receiving the request to locate at least one second computing device associated with the at least one second user who is planning on initiating the fitness activity in a relatively short time;
locating each of the at least one second computing device associated with the at least one second user who is planning on initiating the fitness activity in the relatively short time;
determining the at least one second computing device associated with the least one second user located in the vicinity of the first computing device; and
determining directions for the first user and the at least one second user to meet.

17. The computer system of claim 16, further comprises sending the directions to meet to the first computing device of the first user and to the at least one second computing device associated with the at least one second user.

18. The computer system of claim 16, wherein determining the least one second computing device associated with the least one second user located in the vicinity of the first computing device further comprises determining the at least one second user is engaged in a similar fitness activity as the first user of the first computing device.

19. The computer system of claim 16, wherein determining the least one second computing device associated with the least one second user located in the vicinity of the first computing device further comprises determining the at least one second user is looking for one or more other exercising users to join in exercising.

* * * * *